Jan. 13, 1925. 1,523,312
D. A. TELFER
WINDOW AND WINDSHIELD FROST AND MOISTURE DISSIPATOR
Filed Dec. 22, 1923
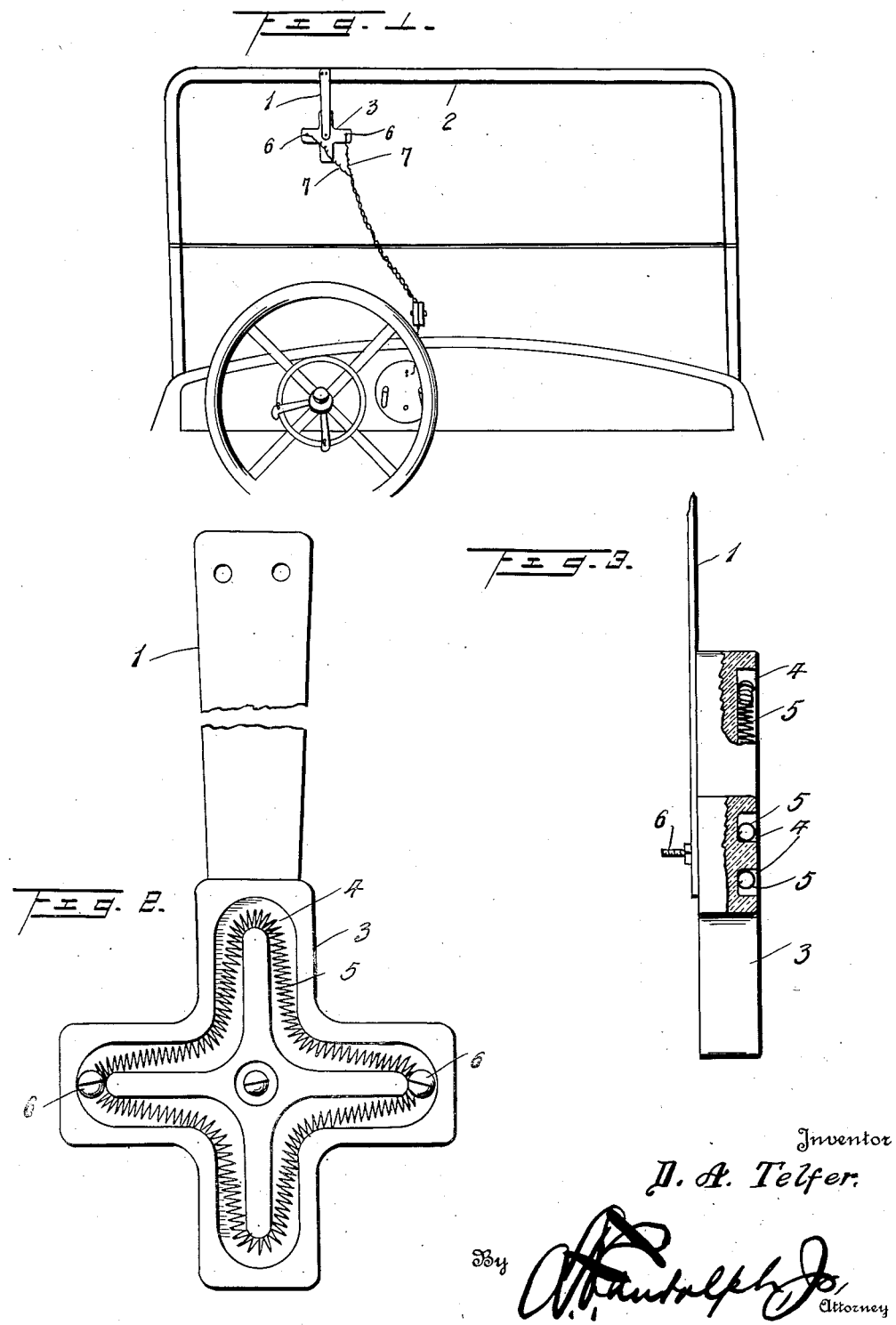
Inventor
D. A. Telfer.

Patented Jan. 13, 1925.

1,523,312

UNITED STATES PATENT OFFICE.

DAVID A. TELFER, OF WISCONSIN RAPIDS, WISCONSIN.

WINDOW AND WINDSHIELD FROST AND MOISTURE DISSIPATOR.

Application filed December 22, 1923. Serial No. 682,249.

*To all whom it may concern:*

Be it known that I, DAVID A. TELFER, a citizen of the United States, residing at Wisconsin Rapids, in the county of Wood and State of Wisconsin, have invented certain new and useful Improvements in Window and Windshield Frost and Moisture Dissipators; and I do hereby declare the following to be a full, clear, and exact description of the invention, such as will enable others skilled in the art to which it appertains to make and use the same.

The object of the present invention is to insure a clear vision for the driver of a motor vehicle, bus, car, locomotive or analogous carrier, or the observer in a signal tower or other place protected by glass or other transparent material, and provides a heater for association with the windshield, or other transparent protector for dissipating moisture and preventing the accumulation of sleet and snow which would tend to obstruct the vision and result in a casualty.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the spirit of the invention.

Referring to the accompanying drawings forming a part of the application:

Figure 1 is a detail view showing the application of the invention to the windshield of a motor vehicle, Figure 2 is a front view of the device, and Figure 3 is a side view thereof partly in section.

Corresponding and like parts are referred to in the following description and designated in the several views of the drawings by like reference characters.

The device comprises an attaching strip 1 which may be of metal or other preferred material and which is adapted to be attached at one end to the frame of a windshield 2 by any suitable means. A body or base 3 is attached to the opposite end of the strip 1 and may be of any suitable insulating material, such as porcelain, fire clay or other refractory material. The body or base 3 may be of any outline and is formed with a channel 4 in which is located an electric heating element 5. Binding posts 6 are applied to the body 3 and the heating element 5 is electrically connected thereto and lead wires 7 connected to the binding posts 6 may receive current from a suitable source of supply such as the storage battery of a motor vehicle, or a feed wire, and if preferred a switch and rheostat may be included in the circuit to control the current supplied to the heating element.

In practice, the device is associated with the windshield or other transparent protector to insure the dissipation of moisture and to prevent any accumulation of sleet or frost, thereby maintaining the windshield in condition to assure a clear vision.

What is claimed is:

A clear vision device for application to a windshield or the like, the same comprising a relatively small body having relatively narrow radiating arms to avoid undue obstruction of vision, means to attach the body to the windshield, said arms being flat, recessed and open at the windshield side thereof, and a heating element completely disposed within said recess.

In testimony whereof I affix my signature in presence of two witnesses.

DAVID A. TELFER.

Witnesses:
B. M. VAUGHAN,
EDW. HONGER.